United States Patent [19]

Buteaux

[11] Patent Number: 5,820,295
[45] Date of Patent: Oct. 13, 1998

[54] COASTAL LAND MASS PROTECTION AND CREATION APPARATUS USING DISCARDED VEHICLE TIRES

[76] Inventor: Leonard J. Buteaux, 207 Doc Rd., New Iberia, La. 70560

[21] Appl. No.: 759,098

[22] Filed: Dec. 3, 1996

[51] Int. Cl.[6] ..................................................... E02B 3/12
[52] U.S. Cl. ................................. 405/21; 405/16; 405/30
[58] Field of Search ................................. 405/15, 16, 21, 405/29, 30, 211–215; 114/219, 220

[56] References Cited

U.S. PATENT DOCUMENTS

| | | | |
|---|---|---|---|
| 3,928,701 | 12/1975 | Roehner | 405/30 X |
| 4,022,434 | 5/1977 | Moore | 405/30 X |
| 4,022,452 | 5/1977 | Dupre | 405/21 X |
| 4,186,913 | 2/1980 | Bruner et al. | 405/21 X |
| 4,196,694 | 4/1980 | Buchanan | 405/30 X |
| 5,007,609 | 4/1991 | Bredovskis | 114/219 X |
| 5,097,785 | 3/1992 | Zidek | 405/212 X |
| 5,380,124 | 1/1995 | Cacossa et al. | 405/30 X |
| 5,624,210 | 4/1997 | Baldwin et al. | 405/232 |

Primary Examiner—Dennis L. Taylor
Attorney, Agent, or Firm—Jesse D. Lambert

[57] ABSTRACT

Support member (10) has stabilizer plate (12) and upper (16) and lower (18) tire holders. Support member (10) spans the diameter of a vehicle tire (22), penetrating the treads of the tire. Upper (16) and lower (18) tire holders are spaced apart so as to closely engage tire (22) and maintain tire (22) at a desired vertical elevation. Cross bar (14) is fastened to support member (10) approximately one half way between upper and lower tire holders (16) and (18), with the ends of cross bar (14) engaging the sidewalls of tire (22), thus preventing rotation of tire (22) about support member (10). The apparatus is installed by driving support member (10) into a water bottom at a desired location, typically near a coastline, with tire (22) direction ally aligned so as to protect the coastline, typically by alignment of the sidewalls or face of the tire perpendicular to prevailing wave and tidal flow. A plurality of the apparatus may be installed so as to form a desired pattern, and a cable or other like connecting means strung through a retaining means at the upper end of each support member (10).

6 Claims, 4 Drawing Sheets

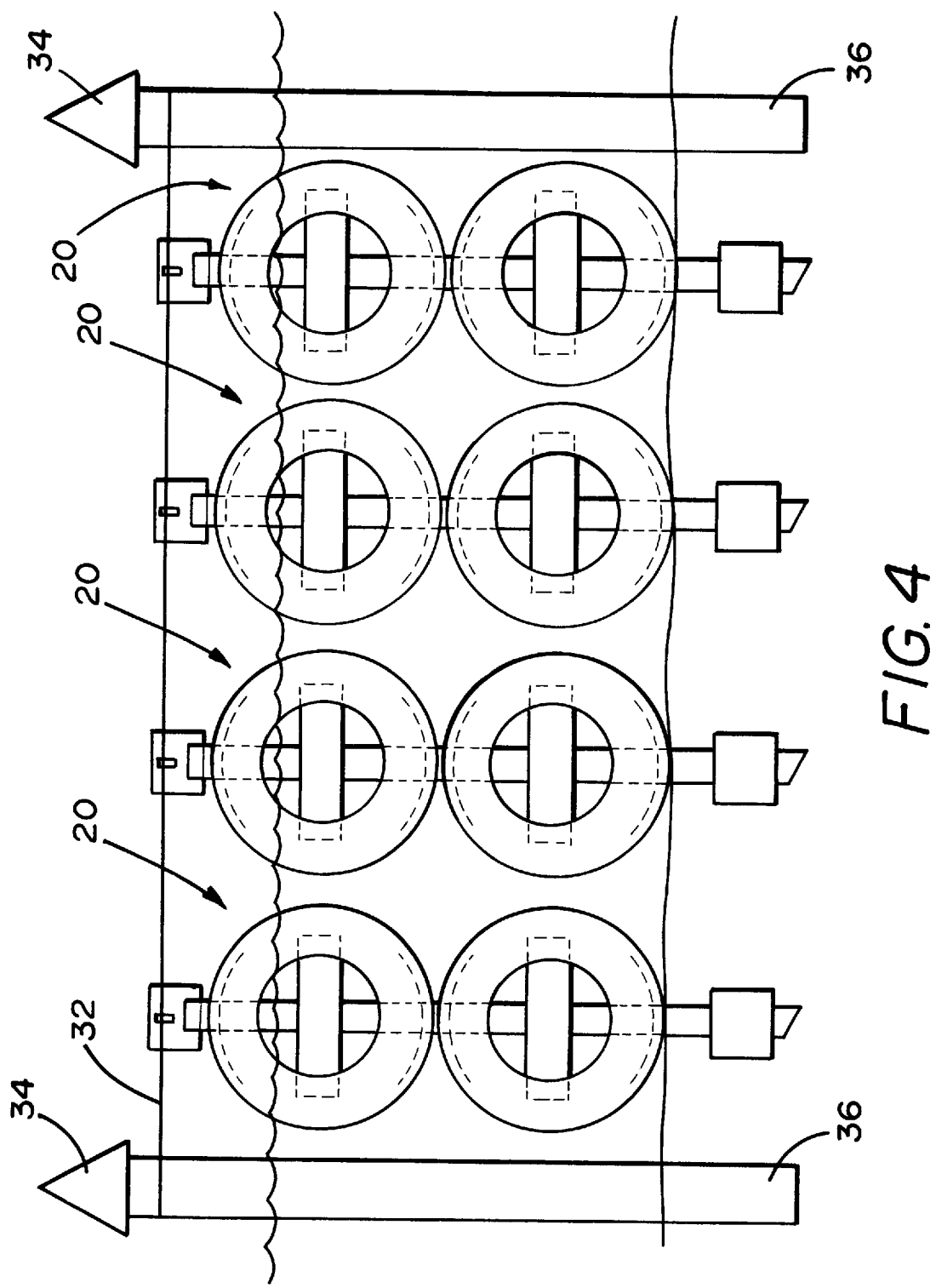

COASTAL LAND MASS PROTECTION AND CREATION APPARATUS USING DISCARDED VEHICLE TIRES

BACKGROUND

1. Field of the Invention

The present invention relates to apparatus for reducing coastal land mass net loss, and more specifically relates to apparatus for reducing coastal erosion by quieting water action (in the form of wave and tidal action) on the coastline, while assisting in the creation of coastal land mass by inducing sediment deposition adjacent the coastline.

2. Description of the Related Art

Coastal erosion is a very significant problem with far-reaching economic impact on not only coastal areas but the entire country. Any coastline is continuously subjected to water movement in the form of wave and tidal action, and in areas of relatively "soft" soils the coastal land mass is readily eroded, or "washed away" by such water movement. Additionally, such land mass is not often rebuilt through deposition of sediments, even though the coastal waters may be quite sediment laden. Instead, the significant water movement adjacent the coast keeps the sediment in suspension, and such sediment is often deposited at offshore locations in more quiescent waters.

The amount of coastal land mass thus lost annually is staggering. For example, the state of Louisiana has over 350 miles of coastline. It is estimated that each year 40 square miles of coastal land in Louisiana is lost due to a combination of erosion and subsidence (the land sinking beneath the water level). A significant portion is unquestionably due to erosion.

To compound the impact of the erosion, the type of land being lost is of the greatest value. Typically, such land comprises low, marshy environments that may be submerged at different tidal situations, then emergent at low tides. Such fertile environments, known as estuaries, are a key component in the production of finfish and shellfish, the tidal marshes providing a place for fish to spawn and for young fish to have refuge from predators, before venturing to more open waters. In addition to fish production, the coastal regions support commercial interests in furbearer and reptile (such as alligator) production, and provide countless hours of recreational use in hunting and fishing. The fish which are produced in such environments may be sought after and caught some distance away, but such activities still depend on the estuaries. In addition to the intangible enjoyment of recreational hunting and fishing, such recreational use has a tremendous economic effect through the sales of supplies and equipment.

A further example of the effects of such net coastal land mass loss is seen in beachfront properties. Again using certain areas in Louisiana as an example, homes that were "beachfront" just a few years ago have been washed away, and homes and camps that were once set back some distance are now "beachfront". Another example is a stretch of state highway along the upper Texas coast, which has essentially washed away and is now impassable.

All of these deleterious effects give rise to a tremendous incentive to halt or at a minimum slow coastal land mass erosion, and if possible, to rebuild land mass by inducing deposition of sediments from the coastal waters.

Various means of protecting selected areas from water action have long taken the form of jetties, breakwaters, etc., usually comprising large blocks or boulders placed near shore. Other large, heavy objects such as old automobiles have also been placed near shore in attempts to slow erosion.

An example of a system using large objects placed near shore in an attempt to control erosion is disclosed in U.S. Pat. No. 4,820,079 to Wheeler (Apr. 11, 1989). Wheeler discloses massive hollow concrete blocks that are arranged near a coastline in a pattern, if desired stacking blocks atop one another. However, such blocks are necessarily expensive to manufacture, given their concrete and reinforcement rod construction. Installation of such apparatus requires considerable manpower and equipment, as the blocks are typically large (for example, 14 feet long, eight feet high, and six feet wide) and very heavy, requiring cranes and barges to transport and maneuver the blocks. Such systems are not amenable to installation by individuals from small craft, for perhaps localized application near a personal camp.

Other prior art apparatus and methods have taken the form of mats that lay on the water bottom and shoreline to effectively isolate the land mass from the water action. Such apparatus do not quiet the water action in any way, but merely prevent its contact with the coastline. Such systems carry several disadvantages. If such mats are made of materials such as concrete pieces, joined by webbing, the mats are very heavy and like the massive block systems require significant manpower and equipment to install. Any such mat system by its nature can have a deleterious effect on the productivity of the coastal estuary, since the interaction of water with the tidal coastline is greatly reduced or eliminated. One example of prior art apparatus is U.S. Pat. No. 5,370,475 to LeBlanc (Dec. 6, 1994), wherein a mat is formed of rows and columns of vehicle tires woven together with cables to form a mat, which is then laid on the water bottom and/or shoreline. The disclosed method of fabricating the mat requires significant time and manpower.

The prior art does not disclose any apparatus amenable to construction using inexpensive, readily available materials such as discarded vehicle tires, that halts or slows coastal land mass erosion by quieting wave and tidal action while permitting the beneficial interaction of water with estuary regions, and that aids in formation of new coastal land mass through inducing sediment deposition by quieting water movement in desired areas. Further, the prior art does not disclose apparatus that maintains vehicle tires at a desired elevation from a water bottom in a substantially vertical position, with the "face" or sidewalls of the tire oriented in a desired direction (usually but not necessarily substantially perpendicular to wave action/tidal movement); that is inexpensive and simple to manufacture and capable of installation from relatively small water craft; that uses widely available materials (discarded vehicle tires) as the waterflow dampening apparatus; and that still permits water flow to estuaries to provide finfish and shellfish breeding habitat while still permitting fish passage therethrough.

OBJECTS AND ADVANTAGES

Accordingly, several objects and advantages of the present invention are:

(a) to provide an apparatus that slows or halts coastal land mass erosion due to water action;

(b) to provide an apparatus that aids in creation of new coastal land mass by inducing sediment deposition in selected areas;

(c) to provide an apparatus that is simple to manufacture from inexpensive, readily available materials, in particular that utilizes discarded vehicle tires;

(d) to provide an apparatus that is amenable to installation in a water body from relatively small water craft; and (e) to provide an apparatus that permits essential water flow to and from sensitive estuary regions so as to sustain finfish and shellfish breeding habitat and that permits fish passage therethrough.

Further objects and advantages are to provide an apparatus for coastal land mass erosion prevention that can be either fabricated onshore and transported offshore, or readily fabricated at an offshore location for installation. Still further objects and advantages will become apparent from a consideration of the ensuing description and drawings.

BRIEF DESCRIPTION OF THE FIGURES

FIG. 4 is a schematic of a plurality of apparatus of the present invention installed in a desired pattern.

DESCRIPTION OF THE PREFERRED EMBODIMENT—FIGS. 1 to 4

Figure 1:
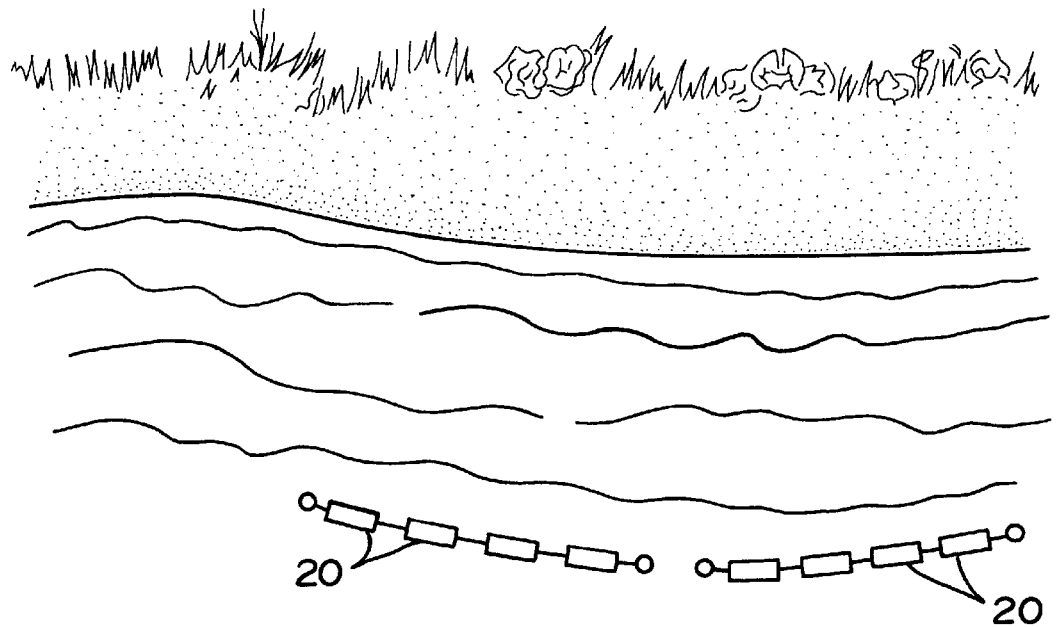
FIG. 1 is a depiction of a coastline, viewed from above, with the apparatus of the present invention in place.

FIG. 1 is a plan view of a typical coastline section showing water action, due to wave and/or tidal action, against the shoreline. It is understood that the water action may be due to natural forces and may also be man-made, from the wake created by passage of watercraft. Such water action may be at any direction with respect to the coastline, depending on the direction of the coastline and of the prevailing winds, etc. FIG. 1 further shows exemplary positioning of the a plurality of apparatus 20 of the present invention, as will be described below.

Figure 2:
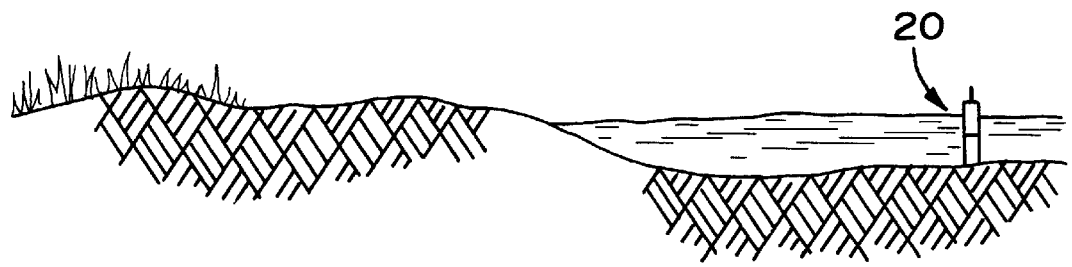
FIG. 2 is a cross section of a coastline showing the near-shore water bottom and the apparatus in place.

FIG. 2 is a cross section of a typical coastline corresponding to that shown in FIG. 1, additionally showing installation of apparatus of the present invention.

Figure 3A:
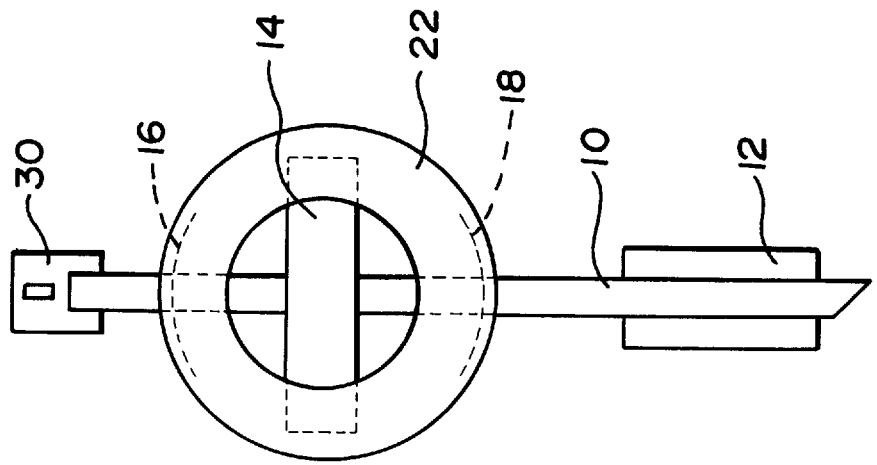
FIG. 3a is a front view schematic of one embodiment of the apparatus, with a tire in place thereon.
Figure 3B:
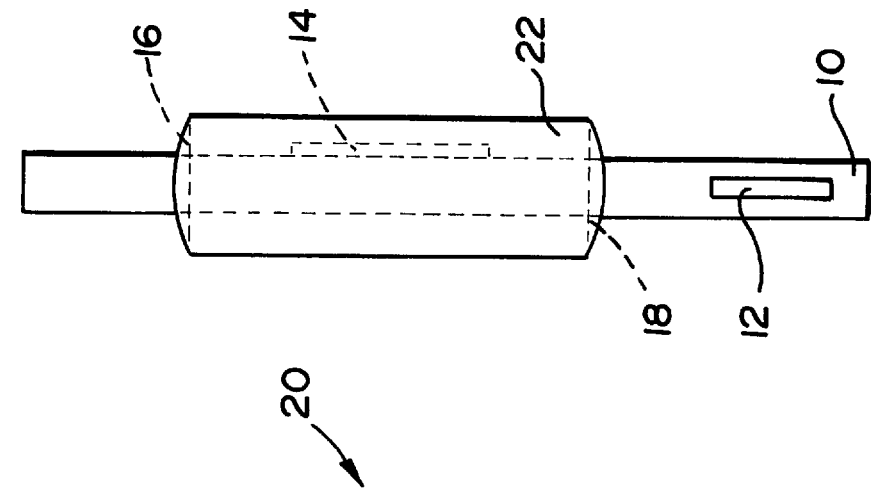
FIG. 3b is side view schematic of one embodiment of the apparatus, with a tire in place thereon.
Figure 3:
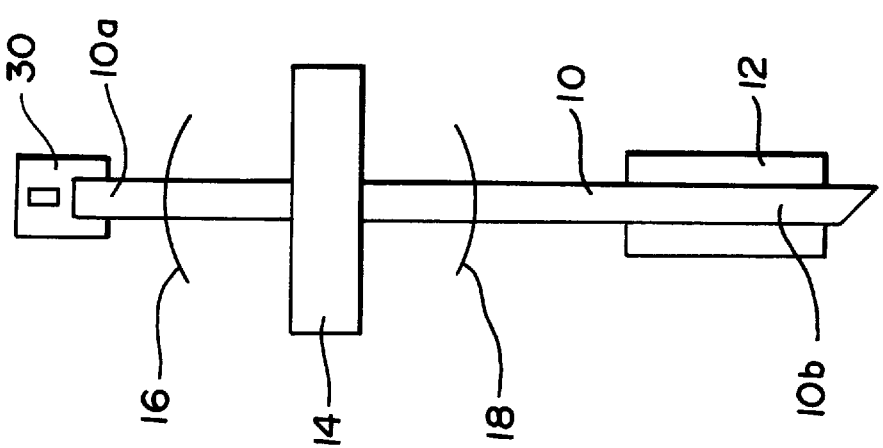
FIG. 3 is a front view schematic of one embodiment of the apparatus.

FIG. 3 is a schematic of the apparatus. Support member 10 has upper and lower ends 10a and 10b with stabilizer plate 12 connected proximal to the lower end. Stabilizer plate 12 is connected by welding, bolting, or other like means to effect a secure attachment. Support member 10 may be made of any strong, rigid material preferably having an elongated cylindrical shape and resistant to corrosion, decay, etc. In the preferred embodiment, support member 10 may be made of cold rolled steel stock one inch in diameter, although it is understood that other materials, such as fiberglass, plastics, and wood could be used, and that the dimensions may be altered as appropriate for particular applications. Stabilizer plate 12, in the preferred embodiment, is made from flat steel stock ¼" in thickness, 4" wide by 12" long, but materials and dimensions may be changed to suit particular situations.

Means for holding a vehicle tire in a desired position on support member 10 are provided, and may take the form of upper tire holder 16 and lower tire holder 18, which are securely fastened to support member 10 by welding, bolting, or other like means. Tire 22 has a tread surface about its circumference and a pair of sidewalls, one on each side of tire 22. Upper tire holder 16 and lower tire holder 18 may be made from flat steel stock in appropriate dimensions to retain a vehicle tire on support member 10, as will be further described herein. While in the preferred embodiment, upper and lower tire holders 16 and 18 are positioned inside of a vehicle tire, it is understood that upper and lower tire holders 16 and 18 may also be fastened to support member 10 outside of a vehicle tire. Cross bar 14 is attached to support member 10 at a point roughly mid way between upper tire holder 16 and lower tire holder 18, with cross bar 14 attached at substantially right angles to the longitude of support member 10. Cross bar 14 is attached to support member 10 by welding, bolting, or other like means, and cross bar 14 may be constructed of flat sheet steel stock of ¼" thickness and 4" width, with the length of cross bar 14 as appropriate to substantially span the diameter of tire 22.

The length of support member 10 may be varied as appropriate depending upon such variables as the size of tires employed, the water depth in which the apparatus is installed, the water bottom penetration depth, and the height above the water surface that tires are brought to.

Cable retaining means 30 is secured to upper end 10a of support member 10. Cable retaining means 30 may take various configurations, in the preferred embodiment comprising a section of flat sheet steel stock and a U-bolt of appropriate diameter for the cable being employed. Cable retaining means 30 may be attached to support member 10 by bolts or other removable means so that the apparatus may first be installed, if necessary by drive blows applied to the upper end of support member 10, before attaching cable retaining means 30. While cable is shown in the preferred embodiment as the linking means, it is understood that other materials such as chain, rope, and the like could be used, or rigid materials such as sections of pipe.

FIGS. 3a and 3b are front and side view schematics of the apparatus of the preferred embodiment, showing tire 22 in place. FIG. 4 shows a plurality of apparatus 20 arranged in a desired pattern, as is described further below.

OPERATION OF THE PREFERRED EMBODIMENT—FIGS. 1 to 4

Referring to FIGS. 1 to 4, one method of fabrication and installation of the preferred embodiment of the present invention is now described. It is understood that the sequence of several of the steps of fabrication and installation may be varied to suit particular situations.

In FIG. 3, stabilizer plate 12 may be attached proximal to lower end 10b of support member 10 by welding, bolting, or other like means of attachment. Tire 22 may then be installed on support member 10 and placed in a desired position along the longitude of support member 10, as in FIGS. 3a and 3b. This position is a function of the desired penetration of the lower end of support member 10 into the water bottom, as it is desired to have the lower edge of tire 22 substantially at or touching the water bottom when apparatus 20 is installed. By way of example only, a lower edge of tire 22 may be positioned approximately 36" from the lower end of support member 10, to provide adequate penetration in a variety of water bottoms; however, the distance from the lower edge of tire 22 to the lower end of support member 10 may be more or less than 36", depending upon particular soil conditions. Tire 22 is preferably installed so that support member 10 substantially spans a diameter of tire 22. Support member 10 penetrates the tread portions of tire 22, and holes may be drilled or cut, as with a hole saw, in the tread portions of tire 22 to permit passage of support member 10 through the tread.

With tire 22 in the desired position on support member 10, lower tire holder 18 is preferably positioned on the inner side of the tread portion of tire 22, preferably contacting the inner tread portion of tire 22. Lower tire holder 18 is then fastened to support member by welding, bolting, or other like means. In similar fashion, upper tire holder 16 is fastened to support member 10, contacting the inner tread of tire 22 at its upper side. Tire 22 is therefore fixed in position on support member 10 and restrained from movement along the longitude of support member 10, and tire 22 will therefore be fixed in elevation once the apparatus is installed in a body of water. It is understood, however, that upper and lower tire holders 16 and 18 may alternatively be attached to support member 10 outside of the tread of tire 22, if desired. Further, upper and lower tire holders 16 and 18 may be fabricated from flat sheet iron stock, or may be formed in arcuate shape for closely matching the curvature of tire 22.

Cross bar 14 is then installed by fitting cross bar 14 within the sidewalls of tire 22 (by flexing said sidewalls as necessary) then welding, bolting, or otherwise attaching cross bar 14 to support member 10 at substantially right angles to the longitude of support member 10. With the installation of cross bar 14, no rotation of tire 22 about the longitude of support member 10 is possible. In like manner, additional tires may be installed on support member 10, placed abutting one another along the longitude of support member 10, to provide a desired vertical span of tires for a given water depth. FIG. 4, described in detail below, shows a plurality of the apparatus of the present invention having two tires on each support member 10.

Tire 22 may any available tire, with the preferred embodiment utilizing discarded passenger and/or commercial vehicle tires available at little or no cost.

Apparatus 20 may be fabricated at a central location on land, then transported to a water craft and thence to the installation location. Alternatively, apparatus 20 may be fully or partially fabricated on site.

Once at the installation site, apparatus 20 is placed into the water with support member 10 maintained substantially vertical, with the lower end of support member 10 driven into the water bottom until tire 22 contacts the water bottom. Cable retaining means 30 may then be attached by bolting or other like means to the upper end of support member 10, support member 10 being of sufficient length to preferably protrude a suitable distance above the water surface. Apparatus 20 is preferably oriented so that a sidewall of tire 22 faces, or is perpendicular to, the prevailing direction of water action, be it wave or tidal action. With such orientation, the maximum benefit of water quieting effect is obtained.

FIG. 4 shows a plurality of apparatus 20 installed in a water body. In the particular embodiment shown, two tires are mounted on each support member 10. While four apparatus are shown arranged in a row to form a desired pattern, it is understood that greater or lesser numbers may be used as appropriate for the particular situation. End posts 36 are installed on either end of the row of apparatus 20, with cable 32 run through cable retaining means 30 on each apparatus, and the ends of cable 32 fastened to end posts 36. Reflective markers 34 may be installed on end posts 36 and on support member 10, if desired, to yield a clear view of the installation to approaching watercraft. Any desired pattern may thus be constructed, as illustrated in FIG. 1 near a shoreline.

Installed in such manner, the apparatus of the present invention acts as a buffer to calm wave and tidal action upon a coastal land mass and thereby reduce or halt erosion. Water flow may still reach the estuary areas, and fish may pass through the various gaps in the apparatus between tires and between each unit of the installation. Sediment-laden water, after passing through the numerous passages in the apparatus defined by the central holes in the tires and the spaces between tires, calms and slows its movement, at which time sediment tends to drop out and form new land mass on the landward side of the installation.

Figure 6:
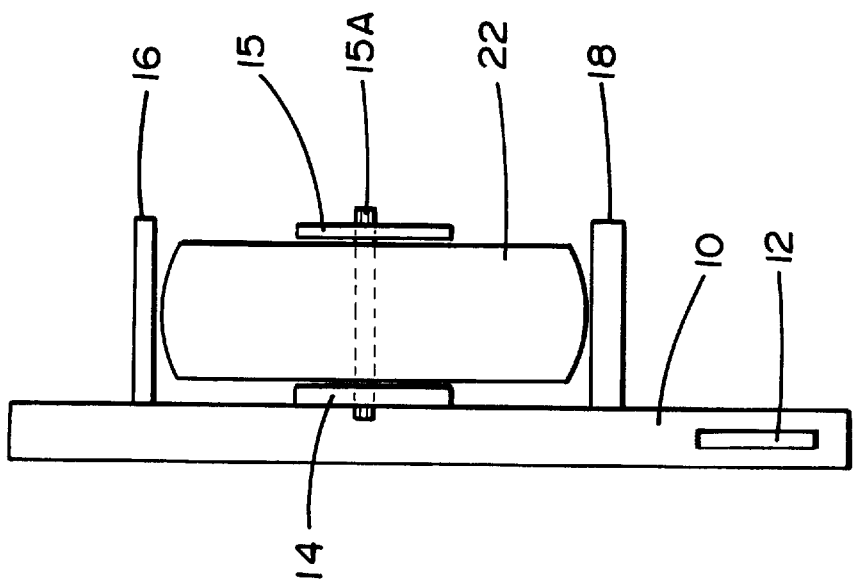
FIG. 6 is a side view schematic of the embodiment of FIG. 5.
Figure 5:
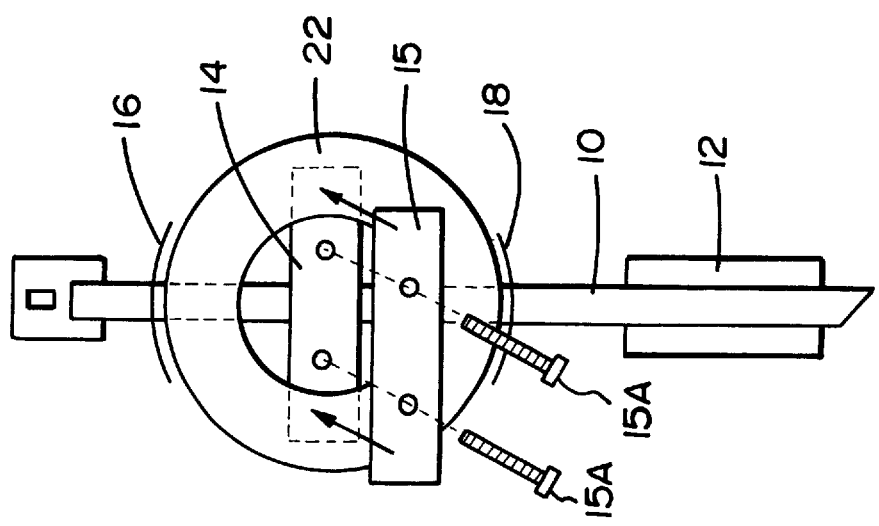
FIG. 5 is a front view schematic of another embodiment of the apparatus of the present invention.

ALTERNATIVE EMBODIMENTS—FIGS. 5 and 6

FIG. 5 is a schematic of an alternative embodiment of the present invention. In this embodiment, support member 10 does not penetrate the treads of tire 22, but instead tire 22 is retained against support member 10. Upper tire holder 16 and lower tire holder 18 are installed on support member 10 outside of the tread of tire 22, with the upper tire holder 16 and lower tire holder 18 preferably extending outwardly from support member 10 far enough to substantially equal the width of the tread of tire 22. Cross bar 14 is installed as described above, and tire 22 fits into the space defined by upper tire holder 16 and lower tire holder 18 and with one sidewall of tire 22 resting against support member 10 and cross bar 14. Thereafter, retainer arm 15 is placed against the remaining sidewall of tire 22, the dimensions of retainer arm 15 being substantially the same as those of cross bar 14. Fastening means 15A, which may comprise threaded bolts and nuts, connect retainer arm 15 to cross bar 14 holding tire 22 securely fixed in place relative to support member 10. As in the preferred embodiment, multiple tires may be arranged on support member 10 to account for the water depth and other conditions.

FIG. 6 is a side view schematic of the embodiment shown in FIG. 5, showing further detail of the placement of tire 22 and its retention on support member 10.

Deployment of this embodiment in a water body is substantially the same as in the preferred embodiment described hereinabove.

SUMMARY

Accordingly, the present invention provides an inexpensive apparatus for reducing coastal land mass net loss by slowing or halting erosion due to water action and further by assisting in formation of new land by inducing sediment deposition. The present invention also provides an apparatus that

- to provide an apparatus that is simple to manufacture from inexpensive, readily available materials, in particular that utilizes discarded vehicle tires;
- is amenable to installation in a water body from relatively small water craft;
- permits essential water flow to and from sensitive estuary regions so as to sustain finfish and shellfish breeding habitat and that permits fish passage therethrough; and
- can be either fabricated onshore and transported offshore, or readily fabricated at an offshore location for installation.

Although the description above contains many specificities, these should not be construed as limiting the scope of the invention but as merely providing illustrations of some of the presently preferred embodiments of the invention. For example, in lieu of using discarded tires, any objects having a similar shape could be employed; different materials could be used for the support member, arcuate members, cross bars, and other parts of the apparatus; the apparatus can be installed in different water depths by adjusting the length of the support member and the number of tires installed, etc.

Thus the scope of the invention should be determined by the appended claims and their legal equivalents, rather than by the examples given.

I claim:

1. An apparatus for protecting and creating coastal land mass, comprising:

an elongated support member having an upper end and a lower end, said elongated support member positioned substantially vertically with said lower end buried in a coastal water bottom in a position spaced apart from a shoreline subject to erosive water action, means for preventing rotation of said elongated support member about its longitude when said lower end of said elongated support member is buried in said water bottom; and at least one tire mounted on said elongated support member in a substantially vertical position, said tire having two opposed sidewall surfaces and a circumferential tread surface, said sidewall surfaces oriented substantially perpendicular to prevailing water flow, said elongated support member penetrating said tread surface of said tire at two opposed points substantially along a diameter of said tire and substantially at a midpoint of a width of said tread surface.

2. The apparatus of claim 1 wherein said means for preventing rotation of said elongated support member comprises a plate rigidly affixed to said elongated support member and extending outwardly therefrom, at least part of said plate buried in said water bottom when said lower end of said elongated support member is buried in said water bottom.

3. The apparatus of claim 2, further comprising:

a plate affixed to said elongated support member so that said tire rests atop said plate; and a cross bar affixed to said elongated support member at a position within a diameter of said tire and having a length sufficient to contact at least one sidewall of said tire.

4. The apparatus of claim 3, further comprising means for attaching a cable to said upper end of said elongated support member.

5. An apparatus for protecting a shoreline from erosion, comprising:

an elongated tubular support member having upper and lower ends and a plate rigidly attached thereto and extending outwardly therefrom, at least part of said plate disposed in the earth when said lower end of said tubular support member is disposed in an earthen water bottom, said tubular support member protruding generally vertically therefrom;

at least one vehicle tire disposed on said tubular support member, said vehicle tire comprising tread and sidewall surfaces, said tubular support member penetrating at least one of said tread surfaces, said tubular support member disposed substantially along a diameter of said tire;

two opposing tire holder means attached to said tubular support member, each of said tire holder means comprising plate means extending outward from said tubular support member, contacting said tread surface and sandwiching said tire therebetween, preventing any substantial movement of said tire along said tubular support member;

means for attaching a cable to said upper end of said tubular support member; and elongated cross bar means attached to said tubular support member and projecting outward therefrom, at least one end of said cross bar means in contact with a sidewall surface of said tire.

6. An apparatus for reducing coastal land mass loss, comprising:

a) a plurality of apparatus comprising:

an elongated tubular support member having upper and lower ends and a plate rigidly attached thereto and extending outwardly therefrom, at least part of said plate disposed in the earth when said lower end of said tubular support member is disposed in an earthen water bottom, said tubular support member protruding generally vertically therefrom;

at least one vehicle tire disposed on said tubular support member, said vehicle tire comprising tread and sidewall surfaces, said tubular support member penetrating at least one of said tread surfaces, said tubular support member disposed substantially along a diameter of said tire;

two opposing tire holder means attached to said tubular support member, each of said tire holder means comprising plate means extending outward from said tubular support member, contacting said tread surface and sandwiching said tire therebetween, preventing any substantial movement of said tire along said tubular support member;

means for attaching a cable to said upper end of said tubular support member; and elongated cross bar means attached to said tubular support member and projecting outward therefrom, at least one end of said cross bar means in contact with a sidewall surface of said tire, said apparatus arranged in an array to form a desired pattern in a body of water by disposing said lower ends of said support members into the water bottom;

b) at least two end members, one of each end members disposed in said water bottom on either end of said array and projecting substantially vertically upward from said water bottom; and c) cable means having first and second ends, said cable means inserted through said cable retaining means on each of said tubular support members, said first end of said cable attached to one of said end members and said second end of said cable attached to the other of said end members.

* * * * *